United States Patent [19]

Trefry

[11] 3,856,422

[45] Dec. 24, 1974

[54] RETENTION CLIP FOR BALL AND SOCKET JOINT

[76] Inventor: William A. Trefry, 29540 Cunningham Dr., Warren, Mich. 48092

[22] Filed: May 29, 1973

[21] Appl. No.: 364,618

[52] U.S. Cl. ............................................. 403/122
[51] Int. Cl. ........................... B25j 3/38, F16b 7/00
[58] Field of Search ............ 403/315, 76, 122, 137, 403/131, 144

[56] References Cited
UNITED STATES PATENTS

| | | | |
|---|---|---|---|
| 2,364,176 | 12/1944 | Waldron | 403/144 |
| 2,530,554 | 11/1950 | Tinnerman | 403/122 |
| 2,854,266 | 9/1958 | Dies | 403/122 |
| 2,987,333 | 6/1961 | Lobdell | 403/122 |
| 3,006,673 | 10/1961 | Swick | 403/122 |

*Primary Examiner*—Geo. V. Larkin
*Attorney, Agent, or Firm*—Whittemore, Hulbert & Belknap

[57] ABSTRACT

A retention clip for a ball and socket joint. The retention clip comprises an elongated resilient metal stamping partially surrounding the socket member and having end portions extending laterally inwardly through slots in the side walls of the socket member. The inner edges of the end portions of the stamping terminate within the socket to retain the ball assembled in the socket. The inner edges of the end portions are engaged by the ball when it is inserted into the socket to flex the stamping sufficiently to allow the ball to enter.

12 Claims, 8 Drawing Figures

Patented Dec. 24, 1974   3,856,422

RETENTION CLIP FOR BALL AND SOCKET JOINT

SUMMARY OF THE INVENTION

The retention clip of this invention is provided to more or less permanently retain a ball and socket joint in assembly. In other words, the retention clip substantially insures that the assembled parts will not accidentally become disassembled in use, although the ball may be removed from the socket by prying the ends of the clip apart. Even this cannot easily be done without a tool. The retention clip therefore serves as a means for providing a permanent assembly of the parts for all practical purposes.

The retention clip is also designed to enable the parts to be assembled fast and easily by simply pushing the ball into the socket with enough pressure to open the retention clip to allow the ball to enter. Once the ball is disposed within the socket the retention clip snaps to a locked position to maintain the assembly.

In a preferred embodiment of the invention, the retention clip is in the form of a metal stamping embracing the socket member and having end portions extending into the socket through slots in opposite walls of the socket member. These end portions are adapted to overlie and retain the ball in the socket. The inner edges of the end portions of the stamping are adapted to be engaged by the ball when the ball is forced into the socket to flex the stamping sufficiently to allow the ball to enter.

The inner edges of both end portions of the stamping may be V-shaped for four-point contact with the ball when it is forced into the socket. The pressure of the ball on these four points opens the stamping to clear the ball as it enters.

In another embodiment of the invention, one of the end portions of the stamping has a V-shaped recess and the other has a straight edge for three-point contact with the ball as it enters the socket. The three-point contact is believed to provide a more balanced stressing of the stamping as a whole so that it will open uniformly when the ball enters. In the drawings.

Figure 1:
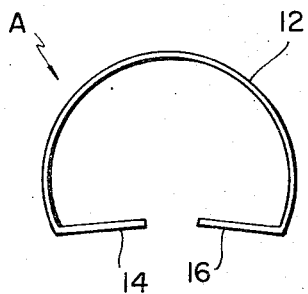
FIG. 1 is a plan view of a spring retention clip constructed in accordance with my invention.

Referring now more particularly to the drawing, A is a spring retainer clip, B is a ball member and C is a socket member.

The spring retainer clip A is shown in FIG. 1 as being in the form of an elongated resilient strip of substantial width relative to its thickness. Preferably the strip is a metal stamping of uniform thickness having a longitudinally curved central portion 12 which extends throughout the major portion of the length of the stamping and terminates in integral end portions 14 and 16. Preferably the curved central portion 12 is arcuate, that is formed on a fixed radius. To increase its flexibility, the central portion 12 may be narrower somewhat than the end portions as will be apparent in the several FIGS. of the drawing.

FIG. 1 shows the retention clip or stamping A in its unstressed or free state condition in which the end portions 14 and 16 are inclined with respect to a plane through their outer edges, that is the points where they join the ends of the central portion 12. This inclination of the end portions 14 and 16 is in a direction toward the central portion 12 from their outer edges to their inner edges. Thus as seen in FIG. 1 both end portions 14 and 16 are bent inwardly slightly from their outer edges to their inner edges with respect to a plane through their outer edges. The purpose of this particular formation of the end portions will become apparent as the description proceeds.

The inner edges of the end portions 14 and 16 have central V-shaped recesses 18 and 20. The V-shaped recess 18 is formed of the two straight edges 22 and 24 and the V-shaped recess 20 is formed of the two straight edges 26 and 28. The recesses 18 and 20 are mirror images of one another and each is symmetrical with respect to the longitudinal center line of the stamping.

The socket member C has a socket 32 therein which is open through one side 34 thereof. The socket 32 is preferably of uniform circular or cylindrical form from the open side 34 of the socket member as indicated at 36 to the bottom of the socket where it is of generally spherical form as indicated at 38. Actually the bottom of the socket need not be truly spherical although the portion 36 should preferably be cylindrical to enable the ball to enter easily. The outer surface of the socket member includes the spherical portion 37 formed on the same radius as the central portion 12 of the unstressed clip A.

The socket member C has a pair of elongated slots 40 and 42 adjacent its open side 34 which extend into the socket 32 through opposite walls of the socket member C. These slots preferably lie in common plane at right angles to the longitudinal axis of the cylindrical portion 36 of the socket 32 and are of a length sufficient to receive the end portions of the metal stamping A as more fully described hereinafter. The slots are formed in the spherical portion 37 of the socket member and are directly opposite one another, although not truly diametrically opposed because the plane of the slots does not pass through the center of the spherical portion 37.

The ball member B has a ball 46 the side portions 48 of which are spherical and formed on a radius slightly less than the radius of the cylindrical portion 36 of the socket 32 so as to fit easily into the socket. The top 50 of the ball is shown as being flat although it could be spherically formed on the same radius as the sides 48 if desired. The bottom of the ball is joined to a circular or cylindrical neck 52 concentric with and of reduced diameter relative to the ball, defining an annular shoulder 54 at the bottom of the ball surrounding the neck.

Figure 2:
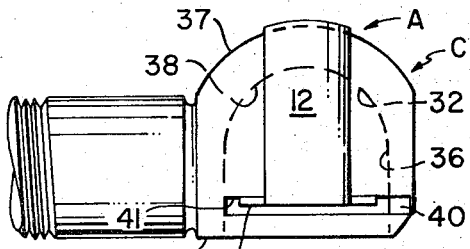
FIG. 2 is a side elevational view of the spring retention clip assembled on a socket member, and also showing a ball member spaced from the open side of the socket member prior to being inserted therein.
Figure 3:
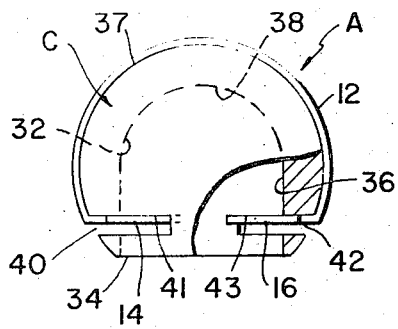
FIG. 3 is a front view with portions broken away and in section showing the socket member with the retention clip assembled thereon.
Figure 4:
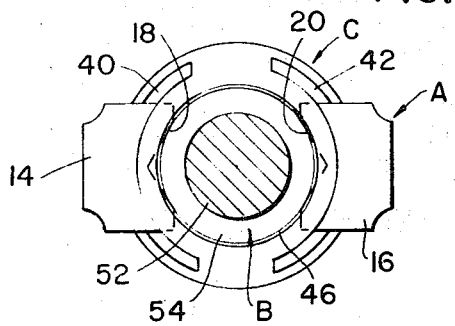
FIG. 4 is a bottom plan view of the assembled socket member and spring retention clip shown in FIG. 3.

The retention clip or stamping A is shown assembled on the socket member in FIGS. 2 to 4. As there shown, the central portion 12 of the stamping embraces the spherical outer surface portion 37 of the socket member. Since the central portion 12 of the unstressed strip is formed on the same radius as the spherical portion 37, the central portion of the stamping is in contact with the spherical outer surface 37 throughout its full length. It will also be noted that the central portion 12 of the stamping is transversely curved throughout its length on the same radius as the outer spherical portion 37 of the socket member and therefore the central portion 12 of the stamping is in substantially full surface-to-surface contact throughout both its length and its width with the outer spherical surface 37.

The end portions 14 and 16 extend through the slots 40 and 42 into the socket 32. The top walls 41 and 43 of the slots 40 and 42 lie in a common plane at right angles to the longitudinal axis of the cylindrical portion 36 of the socket and the arcuate length of the spherical portion 37 measured from the top wall of one slot to the top wall of the other slot in a plane bisecting the slots and normal thereto is substantially equal to the arcuate length of the central portion 12 of the unstressed clip A. Thus when the clip A is asssembled on the socket member C, the end portions 14 and 16 contact the top walls 41 and 43 of the slots and are fixed into a common plane as seen in FIG. 3 in full surface-to-surface relation therewith. Such flexing of the end portions 14 and 16 stresses the entire stamping and draws the central portion 12 thereof into tight surface-to-surface contact with the spherical surface 37 of the socket member throughout substantially the full length and width of the central portion.

Figure 5:
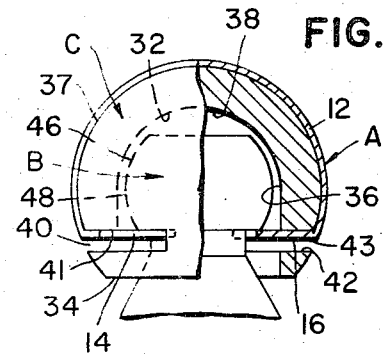
FIG. 5 is similar to FIG. 4 but shows the ball member in a position of partial entry into the socket at which time the ball member contacts the inner edges of the end portions of the retention clip to open it as illustrated.

It will be noted from a comparison of FIGS. 4 and 5 that when the stamping A is assembled on the socket member A, the inner edges of the end portions 14 and 16 are spaced apart a distance less than the diameter of the spherical portion 48 of ball 46. In other words, an imaginary circle inscribed within the sides 22, 24, 26 and 28 of the V-shaped recesses 18 and 20 has a diameter less than that of the ball. Hence when the ball 46 is pressed into the socket through the open side 34, the ball engages the four sides of the V-shaped recesses with substantially point contact and spreads the end portions 14 and 16 apart to flex or open the stamping as shown in FIG. 5. FIG. 5 shows the ball part away into the socket and holding the stamping flexed open. The stamping can flex as shown in FIG. 5 sufficiently to allow the ball to enter but without the risk of becoming separated from the socket member because as shown the end portions of the stamping are still confined by the slots 40 and 42.

Figure 6:
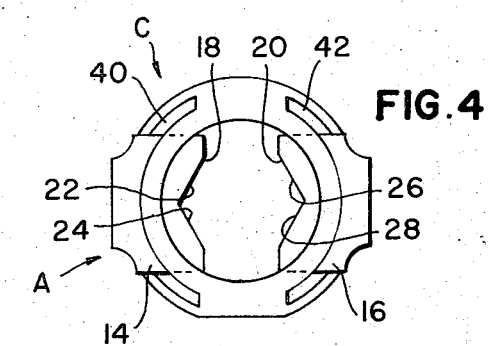
FIG. 6 is similar to FIG. 5 showing the relationship of the parts when the ball is fully inserted in the socket.
Figure 7:
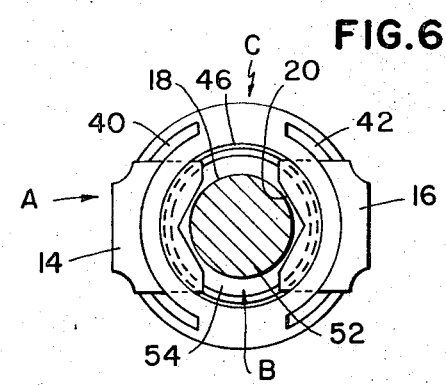
FIG. 7 is a view similar to FIG. 3 but shows the ball fully assembled in the socket.

After the ball has been fully inserted into the socket as shown in FIGS. 6 and 7, the end portions of the stamping flex back to their original position in which the inner edge portions of the end portions 14 and 16 overlie the shoulder 54 of the ball and thus prevent the ball from pulling out of the socket. It is noted in FIG. 6 that the inner edges of the end portions 14 and 16 do not contact the collar 52 so that the stamping has the same snug fit on the socket member after the ball is inserted in the socket (FIGS. 6 and 7) as before (FIG. 3). The ball can be removed from the socket but only if the stamping is pried open to withdraw the end portions 14 and 16 sufficiently to release the ball. Usually a tool is required to pry the stamping open.

Figure 8:
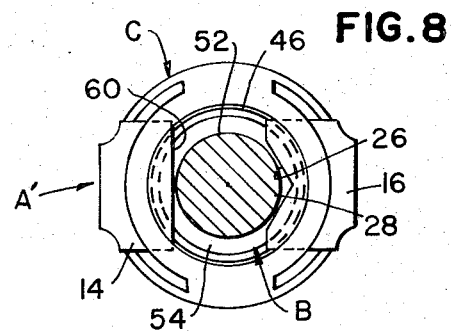
FIG. 8 is similar to FIG. 6 but shows a modification.

FIG. 8 shows a modified stamping A' which is the same as stamping A except that the end portion 14 is modified to the extent that its inner edge 60 is a straight edge at right angles to the longitudinal center line of the stamping. An imaginary circle inscribed within the three edges 26, 28 and 60 is smaller in diameter than the ball 46 so that the ball will cam open the stamping upon entry into the socket. After the ball is inserted into the socket as in FIG. 8, the inner edge portions of the end portions 14 and 16 of the stamping will overlie the annular shoulder 54 of the ball to retain it in assembly. The inner edges 26, 28 and 60 however will not contact the neck 52 of the ball so that the stamping will hug the socket member in the same relationship thereto after the ball has been inserted as before it was inserted.

What I claim as my invention is:

1. A retention clip for holding a ball and socket joint in assembly, said retention clip comprising an elongated resilient metal strip of substantial width relative to its thickness, said strip having a longitudinally curved central portion, said strip terminating in end portions extending from the ends of said central portion laterally inwardly toward one another, the inner edges of said end portions being disposed in spaced relation to one another, said end portions in the unstressed condition of said strip being inclined with respect to a plane through their outer edges in a direction toward said central portion from their outer edges to their inner edges, said end portions being resistant to forces tending to flex them away from said central portion, said central portion being flexible and capable of opening out in response to the application of spreading forces on the inner edges of said end portions.

2. The retention clip defined in claim 1, wherein the inner edges of said end portions have central V-shaped recesses in opposed, confronting relation to one another, said recesses being mirror images of one another and symmetrical with respect to the longitudinal center line of said strip.

3. The retention clip defined in claim 1, wherein the inner edge of one of said end portions has a central V-shaped recess and the inner edge of the other of said end portions has a straight central portion, said recess being symmetrical with respect to the longitudinal center line of said strip, said straight central portion being in opposed, confronting relation to said recess and extending at right angles to the longitudinal center line of said strip.

4. A ball and socket joint including a ball member and a socket member, said socket member having a socket therein opening through one side of said socket member, said socket member being formed with slots adjacent the open side thereof opening into said socket through opposite walls of said socket member, said ball member being insertable into said socket through the open side of said socket member, and a retention clip for holding said ball member in said socket, said retention clip comprising an elongated resilient metal stamping of substantial width relative to its thickness, said stamping having a longitudinally curved central portion embracing the side of said socket member opposite the open side thereof, said stamping having end portions extending from the ends of said central portion laterally inwardly toward one another through said slots, the inner edges of said end portions terminating in said socket and being disposed in spaced relation to one another, said end portions being adapted to overlie and retain said ball member when the latter is received in said socket, the inner edges of said end portions being adapted to be engaged by said ball member upon entry thereof into said socket to flex said stamping sufficiently to allow said ball member to enter.

5. The ball and socket joint defined in claim 4, wherein the inner edges of said end portions have central V-shaped recesses for four-point contact with said ball member upon entry of the latter into said socket as aforesaid.

6. The ball and socket joint defined in claim 4, wherein the inner edge of one of said end portions has a central V-shaped recess and the inner edge of the other of said end portions has a straight central portion for three-point contact with said ball member upon entry of said ball member into said socket as aforesaid.

7. The ball and socket joint defined in claim 4, wherein the outer surface of said socket member embraced by the curved central portion of said stamping is of generally spherical shape, said curved central portion of said stamping is generally arcuate and of the same radius as the spherical portion of said socket member it embraces, said end portions of said stamping in the unstressed condition of said stamping being inclined with respect to a plane through their outer edges in a direction toward said central portion from their outer edges to their inner edges, said end portions being stressed by engagement with said slots and flexed thereby into a common plane so as to hold said curved central portion of said stamping firmly in contact with the spherical portion of said socket member in substantially continuous contact therewith.

8. The ball and socket joint defined in claim 7, wherein said central portion of said stamping is transversely curved on a radius corresponding to the radius of curvature of the spherical portion of said socket member embraced by said central portion so as to have substantially full surface contact therewith.

9. The ball and socket joint defined in claim 8, wherein the inner edge of one of said end portions has a central V-shaped recess, both edges of said V-shaped recess being adapted to contact said ball member upon entry of said ball member into said socket as aforesaid.

10. The ball and socket joint defined in claim 9, wherein the inner edge of the other of said end portions has a central V-shaped recess both edges of which are adapted to contact said ball member upon entry of said ball member into said socket as aforesaid.

11. The ball and socket joint defined in claim 9, wherein the inner edge of the other of said end portions has a straight central portion adapted to contact said ball member upon entry of said ball member into said socket as aforesaid.

12. The retention clip defined in claim 1, wherein the inner edge of one of said end portions has a central recess.

* * * * *